United States Patent [19]
Laurent

[11] 4,269,484
[45] May 26, 1981

[54] VARIFOCAL OPTICAL SYSTEM

[75] Inventor: Francois Laurent, Yverdon, Switzerland

[73] Assignee: Bolex International SA, Ste-Croix, Switzerland

[21] Appl. No.: 5,737

[22] Filed: Jan. 23, 1979

[30] Foreign Application Priority Data

Jan. 27, 1978 [CH] Switzerland ............ 922.786/78

[51] Int. Cl.³ .................................................. G02B 15/16
[52] U.S. Cl. .................................... 350/427; 350/429
[58] Field of Search ................................ 350/184, 186

[56] References Cited
U.S. PATENT DOCUMENTS

| | | | |
|---|---|---|---|
| 2,746,350 | 5/1956 | Hopkins | 350/184 |
| 3,771,853 | 11/1973 | Nakamura | 350/184 |
| 3,912,373 | 10/1975 | Macher | 350/184 |
| 3,992,083 | 11/1976 | Tanaka | 350/184 |
| 4,149,774 | 4/1979 | Hirano et al. | 350/184 |

*Primary Examiner*—John K. Corbin
*Assistant Examiner*—Scott J. Sugarman
*Attorney, Agent, or Firm*—Martin A. Farber

[57] ABSTRACT

An optical system for extremely high focal length variation comprising an attachment of variable magnification and a base objective of fixed focal length, whereby the attachment has at least four lens members which are displaceable along the optical axis with the focal length change. Viewed in the incoming direction of the light, the first and fourth displaceable lens members are displaceable according to the same movement law, and the second and third lens member are displaceable according to movement laws which are different from one another, preferably however being related to each other.

8 Claims, 9 Drawing Figures

VARIFOCAL OPTICAL SYSTEM

FIELD OF THE INVENTION

The invention relates to an optical system for extremely high focal length variation comprising an attachment of variable magnification and a base objective of fixed focal length, whereby the attachment has at least four lens members which are displaceable along the optical axis with the focal length change.

BACKGROUND OF THE INVENTION

In German Offenlegungsschrift OS No. 2,245.105 there is described a varifocal (variable-focus) lens with an extremely large focal or focusing range. This lens or objective is essentially constructed of two partial systems, each of which has two lens groups which are displaceable according to different movement laws. Between the two displaceable lens groups of both partial systems there is provided a stationary lens group which corresponds to or is associated with the first partial system. In this manner and also based on the non-optimized movement laws for the displaceable lens members, the varifocal lens becomes very long and additionally has a considerable expenditure in lenses. This is also the case in a similar manner with the system which has been made known from German Offenlegungsschrift OS No. 2,414.027.

SUMMARY OF THE INVENTION

It is an object of the present invention to create a lens or objective which not only is simple in construction and in the number of optical lens members, but also is shortened in overall length even with comparable performance with known objectives with respect to focal length range.

It is another object of the present invention to aid the solution of the above-mentioned object in the manner that (viewed in the incoming direction of the light) the first and fourth displaceable lens members are displaceable according to the same movement law, and the second and third lens member are displaceable according to movement laws which are different from one another, preferably however being related to each other.

The favorable compact construction of the system in accordance with the invention not only touches on the fact that the optical or refractive power of the otherwise customary stationary lens group which is arranged between the displaceable lens members is transferred to the front member of the system and thereby can be eliminated, but also is due to the adjustment or coordination of the movement laws of the different lens members. From this a mechanical advantage also results with the conception of the displacement device, since with the production of the cam body respectively under the circumstances one can fall back on a movement law which if even merely relates nevertheless is uniform.

An optical system in accordance with the invention can be constructed advantageously such that the first partial system in the attachment is formed by a stationary member, a member which is displaceable for the focal length variation and a member which causes the image position compensation, to which last-mentioned member there follows a member of the second partial system, which latter-mentioned member compensates the wandering of the picture which is produced by the movement of the fifth lens member, the second partial system having an additional stationary member adjacent the base objective.

BRIEF DESCRIPTION OF THE DRAWINGS

With the above and other objects and advantages in view, the present invention will become more clearly understood in connection with the detailed description of preferred embodiments, when considered with the accompanying drawings, of which.

SPECIFIC DESCRIPTION

Figure 1:
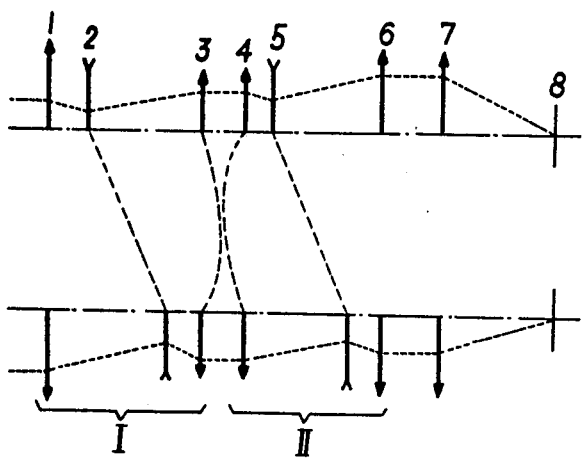
FIGS. 1-4 are schematic illustrations of the construction of optical systems in accordance with the invention, and respectively, the movement course of the displaceable lens groups over the entire focal length range.

Referring now to the drawings and more particularly to FIG. 1, the optical system schematically illustrated there comprises a stationary positive front group which is made of four lens members 2 to 5, which lens members are adjacent to one another and displaceable along the optical axis, and finally of two, on the other hand, stationary lens members 6 and 7, which focus a light beam coming from infinity onto the image plane 8. The optical system can be considered constructed as made of two partial systems I, II, whereby the beam coming from infinity emerging from each partial system is afocal.

While the lens members 2 and 5 perform a linear displacement movement over the entire focal length range, the movement law for the lens members 3 and 4 are related to one another. This relationship may be mathematically expressed in the manner that with a displacement law for the member 3 $f(x, y)$ the displacement law for the member 4 is at $-f(x, y)$.

Figure 2:
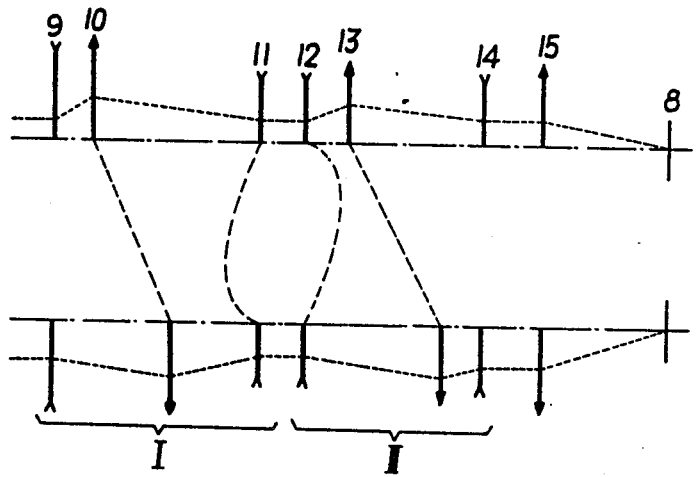
Figure 3:
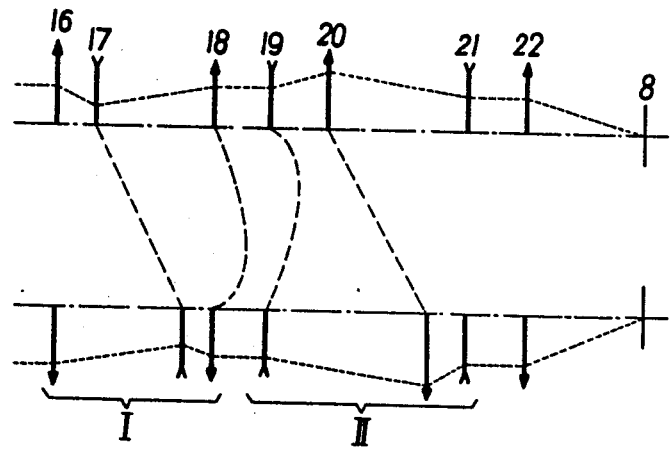
Figure 4:
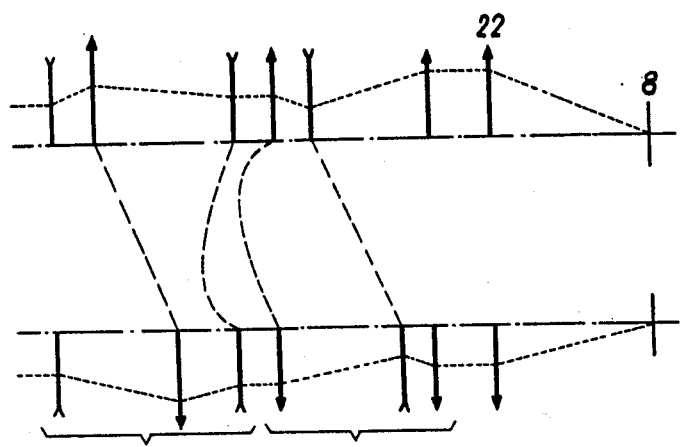

The focal length and the magnification of the, and respectively by the, lens members 2 and 5 are equal. In FIG. 2 an example of a different optical system is shown, which example is illustrated in relation to that in FIG. 1 according to the sign of the lens members. The displacement law of the moveable lens members however remains the same as already described. The negative front member 9 follows a positive lens member 10, the latter with a likewise positive lens member 13 can be displaced according to a linear movement law. Two negative lens members 11 and 12 are arranged between these two lens members. The displacement laws of these lens members 11 and 12 remain the same as with the system illustrated in FIG. 1 with the lens members 3 and 4. The focal length and the magnification of the, and respectively by the, members 10 and 13 on the other hand are equal. The lens members 9 to 11 form the first partial system I, while the lens members 12 to 14 constitute the second partial system II. FIG. 3 schematically shows an additional solution for an optical system according to the present invention, whereby a positive front member 16 follows displaceable lens members 17 to 20 along the optical axis. A partial system II of a corresponding or associated lens member 21 follows a base objective 22, the latter collecting the axial-parallel incident rays in the image plane 8. The lens members 17 and 20 again are displaceable according to linear movement laws. The relationship of the displacement laws for the positive lens group 18 and for the negative lens group 19 may be mathematically represented in the manner that with a function f (x, y) for the member 18, the sign of the y-coordinate is inverted relative to the function for the member 19 f (x, −y). This applies also for the system illustrated in FIG. 4, with which the sign of the optical power of the individual lens members are reversed up to the base objective 22, the latter being adjacent the image plane 8. In both cases the focal length of the first and fourth displaceable member is the same as also is the magnification by these two members in the particular focal length positions.

Figure 5:
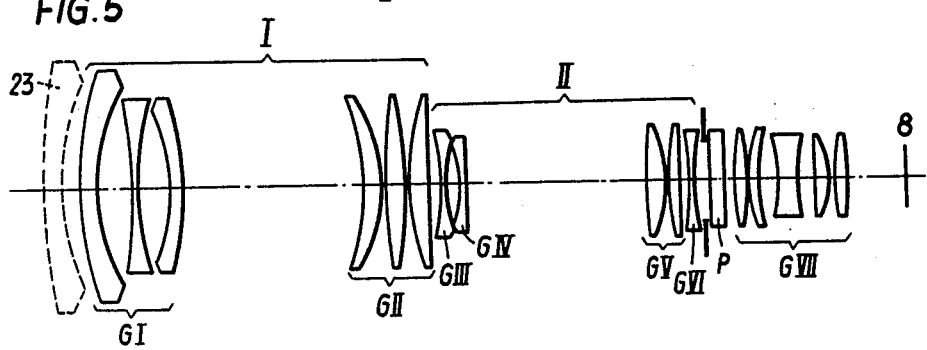
FIGS. 5-7 respectively each illustrate one optical system in detail.

FIG. 5 shows an optical system illustrated in detail for 20 X magnification enlargement, for example between 4 mm and 80 mm focal length for the objective according to the following data, within a deviation of the curvature of individual surfaces and of the thicknesses of up to ±10% of the refractive or optical power of the corresponding member, of the indexes of refraction up to ±0.03 and of the Abbe numbers up to ±5:

| r | l[d] | $n_d$ | $v_d$ |
|---|---|---|---|
| aspheric | | | |
| | 5.0 | 1.492 | 54.67 |
| 81.69 | | | |
| | 5.0 | | |
| 88.00 | | | |
| | 3.5 | 1.784 | 26.08 |
| 43.00 | | | |
| | 8.0 | | |
| −140.00 | | | |
| | 3.0 | 1.784 | 26.08 |
| 120.00 | | | |
| | 8.0 | | |
| −31.00 | | | |
| | 2.0 | 1.784 | 26.08 |
| −83.76 | | | |
| | $l_I$ | | |
| −80.00 | | | |
| | 5.5 | 1.744 | 44.77 |
| −35.32 | | | |
| | 0.1 | | |
| 196.20 | | | |
| | 6.0 | 1.744 | 44.77 |
| −85.00 | | | |
| | 0.1 | | |
| 54.00 | | | |
| | 6.0 | 1.744 | 44.77 |
| 886.95 | | | |
| | $l_{II}$ | | |
| −45.00 | | | |
| | 1.0 | 1.781 | 37.09 |
| 58.79 | | | |
| | $l_{III}$ | | |
| −25.38 | | | |
| | 1.0 | 1.781 | 37.09 |
| ∞ | | | |
| | $l_{IV}$ | | |
| 348.10 | | | |
| | 4.2 | 1.563 | 60.80 |
| −27.00 | | | |
| | 0.1 | | |
| 37.26 | | | |
| | 3.4 | 1.563 | 60.80 |
| ∞ | | | |
| | $l_V$ | | |
| −40.00 | | | |
| | 1.65 | 1.781 | 37.09 |
| 78.85 | | | |
| | 2.0 | | |
| ∞ | | | |
| | 5.0 | 1.568 | 56.13 |
| ∞ | | | |
| | 2.0 | | |
| 33.33 | | | |
| | 3.3 | 1.640 | 60.10 |

-continued

| r | l[d] | $n_d$ | $v_d$ |
|---|---|---|---|
| −194.60 | | | |
| | 0.1 | | |
| 22.14 | | | |
| | 3.8 | 1.640 | 60.10 |
| 45.29 | | | |
| | 5.1 | | |
| −21.14 | | | |
| | 3.7 | 1.846 | 23.83 |
| 21.14 | | | |
| | 4.15 | | |
| −408.30 | | | |
| | 5.0 | 1.691 | 54.71 |
| −14.90 | | | |
| | 0.1 | | |
| 25.87 | | | |
| | 3.0 | 1.691 | 54.71 |
| −300.00 | | | |
| | 16.18 | | | | wherein r is the radius, d is the lens thickness, $n_d$ is the index of refraction and $v_d$ is the Abbe number, whereby the non-spericalness is defined by the following formula:

| aspheric: | R | $a_2$ | $a_4$ | $a_6$ |
|---|---|---|---|---|
| | 30.0 | 0 | $4.10^{-6}$ | $1.10^{-9}$ |

The displacement characteristic of the moveable lens members of this objective corresponds to the movement scheme illustrated in FIG. 2. Since the distortion in the range of the shorter focal length increases particularly between 4 and 80 mm, it is advantageous to set an aspherically formed correction lens 23 in front of the system. Advantageously even a reduction of the relative opening of the minimum focal length with 1:1.2 to 1:1.9 with focal length 8 mm and 1:2.8 with 80 mm is obtained.

The variable air separations between the individual lens members may be learned from the following table:

| f | $l_I$ | $l_{II}$ | $l_{III}$ | $l_{IV}$ | $l_V$ |
|---|---|---|---|---|---|
| 4 | 59.05 | 4.65 | 4.0 | 48.50 | 5.59 |
| 8.2 | 49.31 | 7.29 | 25.96 | 23.91 | 15.33 |
| 17.14 | 37.12 | 12.67 | 31.82 | 12.67 | 27.51 |
| 27.22 | 29.28 | 18.73 | 29.57 | 8.85 | 35.36 |
| 44.97 | 21.65 | 29.41 | 21.46 | 6.28 | 42.99 |
| 60.50 | 17.83 | 38.76 | 13.12 | 5.27 | 46.81 |
| 80 | 15.20 | 49.50 | 4.0 | 4.65 | 49.44 |

Figure 6:
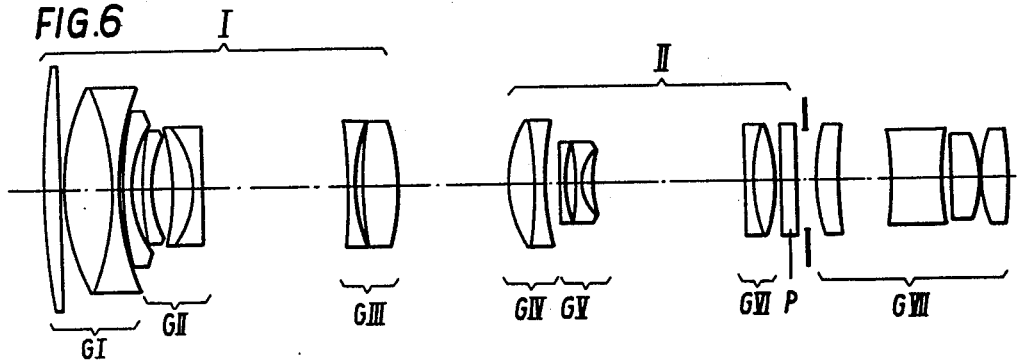

Data of the system illustrated in FIG. 6 can be learned for example from the following table, within a deviation of the curvature of individual surfaces and of the thicknesses of up to ±10% of the refractive or optical power of the corresponding member, of the indexes of refraction up to ±0.03 and of the Abbe numbers up to ±5:

| r | d[l] | $n_d$ | $v_d$ |
|---|---|---|---|
| 129.83 | | | |
| | 5.0 | 1.788 | 47.39 |
| ∞ | | | |
| | 0.05 | | |
| 49.00 | | | |
| | 12.5 | 1.719 | 50.41 |
| −73.10 | | | |
| | 2.0 | 1.721 | 29.25 |

-continued

| r | d[l] | $n_d$ | $v_d$ |
|---|---|---|---|
| 65.84 | | | |
| | $l_I$ | | |
| 150.0 | | | |
| | 1.85 | 1.620 | 60.33 |
| 31.05 | | | |
| | 2.85 | | |
| 114.0 | | | |
| | 1.5 | 1.620 | 60.33 |
| 26.10 | | | |
| | 5.5 | | |
| −53.0 | | | |
| | 6.5 | 1.784 | 26.08 |
| −18.5 | | | |
| | 1.0 | 1.788 | 47.39 |
| −3076.27 | | | |
| | $l_{II}$ | | |
| −155.0 | | | |
| | 1.5 | 1.625 | 35.70 |
| 52.0 | | | |
| | 1.25 | | |
| 91.0 | | | |
| | 9.0 | 1.696 | 56.18 |
| −37.39 | | | |
| | $l_{III}$ | | |
| 28.9 | | | |
| | 7.5 | 1.589 | 61.27 |
| −62.5 | | | |
| | 2.0 | 1.620 | 36.37 |
| 75.0 | | | |
| | $l_{IV}$ | | |
| ∞ | | | |
| | 1.35 | 1.691 | 54.71 |
| 28.75 | | | |
| | 2.5 | | |
| −142.0 | | | |
| | 0.85 | 1.620 | 60.33 |
| 9.4 | | | |
| | 3.5 | 1.620 | 36.37 |
| 28.63 | | | |
| | $l_V$ | | |
| 935.0 | | | |
| | 2.0 | 1.647 | 33.85 |
| 28.75 | | | |
| | 6.0 | 1.623 | 58.06 |
| −44.60 | | | |
| | 1.0 | | |
| ∞ | | | |
| | 5.0 | 1.568 | 56.13 |
| ∞ | | | |
| | 3.3 | | |
| 39.15 | | | |
| | 7.0 | 1.744 | 44.77 |
| 248.55 | | | |
| | 12.35 | | |
| −50.0 | | | |
| | 13.75 | 1.805 | 25.43 |
| 50.0 | | | |
| | 1.55 | | |
| 667.0 | | | |
| | 7.45 | 1.670 | 47.11 |
| −38.7 | | | |
| | 0.25 | | |
| 40.0 | | | |
| | 7.25 | 1.620 | 60.33 |
| −194.55 | | | |
| | 32.10 | | |

This objective, the displaceable lens members of which are moveable according to the principle illustrated in FIG. 1, has a focal width range from 10 to 300 mm and is made of 20 lenses.

The variable air separations between the individual lens members are to be learned from the following table:

| f | $l_I$ | $l_{II}$ | $l_{III}$ | $l_{IV}$ | $l_V$ |
|---|---|---|---|---|---|
| 10 | 1.75 | 38.08 | 27.0 | 3.64 | 38.23 |
| 31 | 12.49 | 35.49 | 4.46 | 28.76 | 27.49 |
| 55 | 19.68 | 32.53 | 2.20 | 33.97 | 20.3 |
| 97 | 26.88 | 27.35 | 4.46 | 36.92 | 13.10 |
| 198 | 34.38 | 14.85 | 15.00 | 38.87 | 5.60 |
| 300 | 37.62 | 2.22 | 27.0 | 39.57 | 2.36 |

Figure 7:
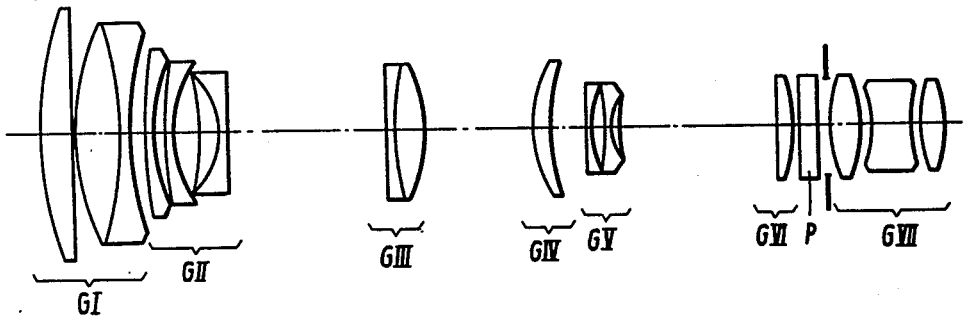

For the objective illustrated in FIG. 7 the following data is set forth by way of example, within a deviation of the curvature of individual surfaces and of the thicknesses of up to ±10% of the refractive or optical power of the corresponding member, of the indexes of refraction up to ±0.03 and of the Abbe numbers up to ±5:

| r | d[l] | $n_d$ | $v_d$ |
|---|---|---|---|
| 124.0 | | | |
| ∞ | 6.5 | 1.744 | 44.77 |
| ∞ | | | |
| | 0.1 | | |
| 65.54 | | | |
| | 14.0 | 1.719 | 50.41 |
| −54.0 | | | |
| | 2.0 | 1.721 | 29.25 |
| 116.65 | | | |
| | $l_I$ | | |
| 150.0 | | | |
| | 1.85 | 1.623 | 58.06 |
| 31.05 | | | |
| | 3.5 | | |
| 114.0 | | | |
| | 1.5 | 1.623 | 58.06 |
| 26.10 | | | |
| | 6.5 | | |
| −53.0 | | | |
| | 6.5 | 1.784 | 26.08 |
| −18.5 | | | |
| | 1.0 | 1.788 | 47.39 |
| −838.1 | | | |
| | $l_{II}$ | | |
| −428.14 | | | |
| | 1.5 | 1.784 | 26.08 |
| 57.0 | | | |
| | 1.25 | | |
| 91.0 | | | |
| | 7.0 | 1.691 | 54.71 |
| −37.36 | | | |
| | $l_{III}$ | | |
| 28.9 | | | |
| | 5.0 | 1.589 | 61.27 |
| 71.46 | | | |
| | $l_{IV}$ | | |
| ∞ | | | |
| | 1.35 | 1.691 | 54.71 |
| 28.75 | | | |
| | 2.5 | | |
| −142.0 | | | |
| | 0.85 | 1.620 | 60.33 |
| 9.4 | | | |
| | 3.5 | 1.620 | 36.37 |
| 28.63 | | | |
| | $l_V$ | | |
| 935.0 | | | |
| | 1.0 | 1.623 | 58.06 |
| ∞ | | | |
| | 4.0 | 1.623 | 58.06 |
| −47.34 | | | |
| | 1.0 | | |
| ∞ | | | |
| | 5.0 | 1.568 | 56.13 |
| ∞ | | | |
| | 3.3 | | |
| 31.55 | | | |
| | 7.7 | 1.623 | 58.06 |
| −67.50 | | | |
| | 1.4 | | |
| −43.47 | | | |
| | 10.5 | 1.762 | 26.53 |

-continued

| r | d[1] | $n_d$ | $v_d$ |
|---|---|---|---|
| 19.68 | | | |
| | 2.65 | | |
| 27.10 | | | |
| | 6.5 | 1.788 | 47.39 |
| −44.44 | | | |
| | 30.46 | | |

This objective simply constructed for the large focal length range is adjustable between 8 and 245 mm focal length, whereby the displaceable lens members are displaced according to the law illustrated in FIG. 1.

The variable air separations between the individual lens members are to be learned from the following table:

| f | $l_I$ | $l_{II}$ | $l_{III}$ | $l_{IV}$ | $l_V$ |
|---|---|---|---|---|---|
| 8.2 | 2.2 | 39.27 | 27.0 | 8.11 | 40.2 |
| 25.4 | 12.9 | 36.67 | 4.47 | 33.24 | 29.45 |
| 44.8 | 20.13 | 33.73 | 2.19 | 38.43 | 22.28 |
| 79.4 | 27.32 | 28.53 | 4.47 | 41.39 | 15.05 |
| 162.3 | 34.82 | 16.02 | 15.03 | 43.35 | 7.53 |
| 246 | 38.06 | 3.40 | 27.0 | 43.98 | 4.32 |

Figure 8:
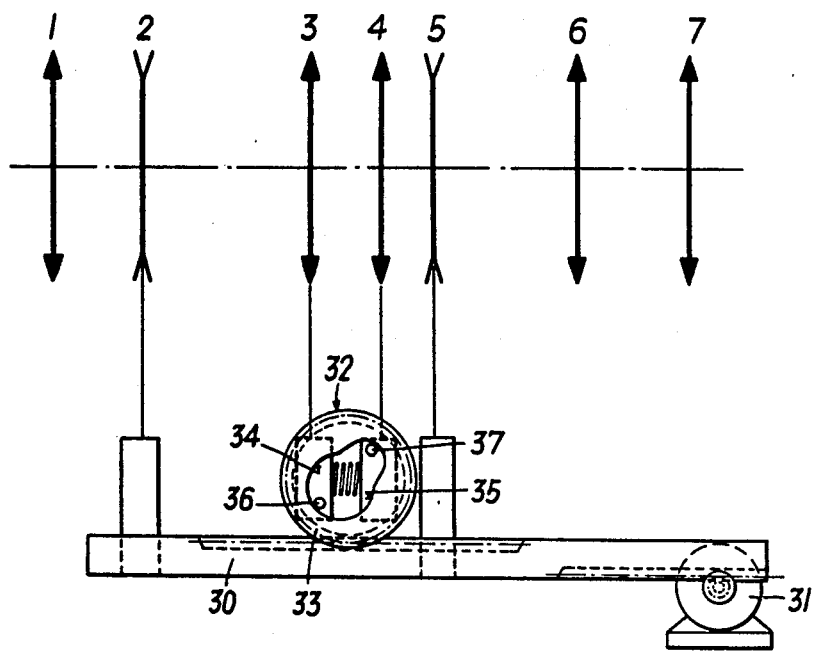
FIGS. 8 and 9 are schematic diagrams of a possible construction for a displacement or adjustment device of an optical system sketched in FIGS. 1 and 2.

Finally in FIG. 8 a mechanical displacement device is shown for the objective illustrated in FIG. 1 or in FIGS. 6 and 7. The coupling between the not illustrated mountings or barrels are indicated by full lines between the lens members 2 and 5 and a toothed rod or gear rack 30. This toothed rod 30, which is moveable along the optical axis by means of a zoom motor 31, directly drives the linearly adjustable lens members 2 and 5. A disc or plate cam 32, which is moved in rotation with the displacement of the toothed rod 30 by means of a pinion 33, has two cams 34 and 35, which cams each respectively extend over 180°. A sensor (or cam follower) 36 for the member 3 and a sensor (or cam follower) 37 for the member 4, respectively, is non-positively or spring-biased in engagement with each of these cams.

Figure 9:
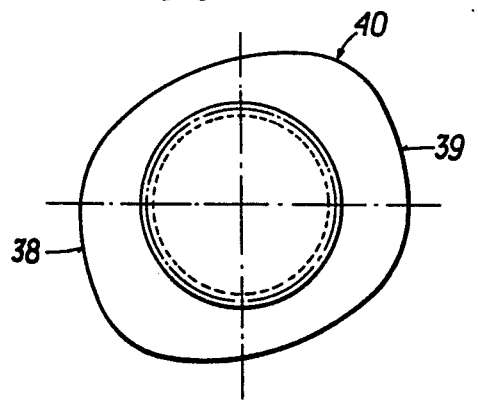

The production of the cam body 32 is simplified by the similarity or uniformity of the cams 34 and 35, whereby they can be formed as inner cams although not absolutely in any case, but as FIG. 9 shows they also can be formed as outer cams. The shape of the cams 38, 39 of the cam body 40 is coordinated to or associated with the movement characteristic which is illustrated in FIG. 2. Naturally also a formation of the cams as a slot in a customary body of the tube of the cam could be possible.

While I have disclosed several embodiments of the invention, it is to be understood that these embodiments are given by example only and not in a limiting sense.

I claim:

1. An optical system for extremely high focal length variation, comprising an attachment of variable magnification and a base objective of fixed focal length, whereby the attachment has at least four lens members which are displaceable along the optical axis with the focal length change, comprising (viewed in the incoming direction of the light)
   first and fourth displaceable lens members,
   second and third lens members,
   means for displacing said first and fourth displaceable lens members according to the same movement law,
   means for displacing said second and third lens members according to movement laws which are different from each other,
   the attachment comprises a first and a second partial system, each said partial system has two displaceable said lens members,
   at least said first partial system is afocal,
   a base objective,
   said first partial system in the attachment comprises,
   a stationary first member, a means comprising a second member displaceable for the focal length variation,
   means constituting a third member for bringing about an image position compensation,
   said second partial system comprises a fourth member following said third member,
   a moveable fifth lens member, said fourth member constitutes means for compensating wandering of the image which is produced by movement of said fifth lens member,
   said second partial system includes an additional stationary member adjacent said base objective.

2. The optical system as set forth in claim 1, wherein the movement laws for displacing said second and third lens members are related to each other.

3. The optical system as set forth in claim 1, wherein the four said lens members are adjacent one another.

4. The optical system as set forth in claim 1, wherein said means constitute a displacement device for said lens members which are moveable along the optical axis with the focal length adjustment,
   said displacement device comprises a rotatably mounted cam body, said cam body is operatively coordinated to said second and third lens members,
   said cam body in radial direction has two cam section means each extending over 180° thereof for controlling the movements of said second and third lens members, respectively.

5. The optical system as set forth in claim 4, wherein both said cam section means are arranged axially opposite.

6. An optical system for extremely high focal length variation, comprising an attachment of variable magnification and a base objective of fixed focal length, whereby the attachment has at least four lens members which are displaceable along the optical axis with the focal length change, comprising (viewed in the incoming direction of the light)
   first and fourth displaceable lens members,
   second and third lens members,
   means for displacing said first and fourth displaceable lens members according to the same movement law,
   means for displacing said second and third lens members according to movement laws which are different from each other,
   the optical system having the following data, within a deviation of the curvature of individual surfaces and of the thicknesses of up to ±10% of the optical power of the corresponding member, of the indexes of refraction up to ±0.03 and of the Abbe numbers up to ±5:

| r | l[d] | $n_d$ | $v_d$ |
|---|---|---|---|
| aspheric | | | |
| | 5.0 | 1.492 | 54.67 |
| 81.69 | | | |

-continued

| r | l[d] | $n_d$ | $v_d$ |
|---|---|---|---|
| 88.00 | 5.0 | | |
| | 3.5 | 1.784 | 26.08 |
| 43.00 | | | |
| | 8.0 | | |
| −140.00 | | | |
| | 3.0 | 1.784 | 26.08 |
| 120.00 | | | |
| | 8.0 | | |
| −31.00 | | | |
| | 2.0 | 1.784 | 26.08 |
| −83.76 | | | |
| | $l_I$ | | |
| −80.00 | | | |
| | 5.5 | 1.744 | 44.77 |
| −35.32 | | | |
| | 0.1 | | |
| 196.20 | | | |
| | 6.0 | 1.744 | 44.77 |
| −85.00 | | | |
| | 0.1 | | |
| 54.00 | | | |
| | 6.0 | 1.744 | 44.77 |
| 886.95 | | | |
| | $l_{II}$ | | |
| −45.00 | | | |
| | 1.0 | 1.781 | 37.09 |
| 58.79 | | | |
| | $l_{III}$ | | |
| −25.38 | | | |
| | 1.0 | 1.781 | 37.09 |
| ∞ | | | |
| | $l_{IV}$ | | |
| 348.10 | | | |
| | 4.2 | 1.563 | 60.80 |
| −27.00 | | | |
| | 0.1 | | |
| 37.26 | | | |
| | 3.4 | 1.563 | 60.80 |
| ∞ | | | |
| | $l_V$ | | |
| −40.00 | | | |
| | 1.65 | 1.781 | 37.09 |
| 78.85 | | | |
| | 2.0 | | |
| ∞ | | | |
| | 5.0 | 1.568 | 56.13 |
| ∞ | | | |
| | 2.0 | | |
| 33.33 | | | |
| | 3.3 | 1.640 | 60.10 |
| −194.60 | | | |
| | 0.1 | | |
| 22.14 | | | |
| | 3.8 | 1.640 | 60.10 |
| 45.29 | | | |
| | 5.1 | | |
| −21.14 | | | |
| | 3.7 | 1.846 | 23.83 |
| 21.14 | | | |
| | 4.15 | | |
| −408.30 | | | |
| | 5.0 | 1.691 | 54.71 |
| −14.90 | | | |
| | 0.1 | | |
| 25.87 | | | |
| | 3.0 | 1.691 | 54.71 |
| −300.00 | | | |
| | 16.18 | | | whereby r is the radius, d is the lens thickness, $n_d$ is the index of refraction and $v_d$ is the Abbe number, whereby the non-spherical-ness is defined by the following formula:

| aspheric: | R | $a_2$ | $a_4$ | $a_6$ |
|---|---|---|---|---|
| | 30.0 | 0 | $4 \cdot 10^{-6}$ | $1 \cdot 10^{-9}$ |

7. An optical system for extremely high focal length variation, comprising an attachment of variable magnification and a base objective of fixed focal length, whereby the attachment has at least four lens members which are displaceable along the optical axis with the focal length change, comprising (viewed in the incoming direction of the light)
first and fourth displaceable lens members,
second and third lens members,
means for displacing said first and fourth displaceable lens members according to the same movement law,
means for displacing said second and third lens members according to movement laws which are different from each other,
the optical system having the following data, within a deviation of the curvature of individual surfaces and of the thicknesses of up to ±10% of the optical power of the corresponding member, of the refractive indexes up to ±0.03 and of the Abbe numbers up to ±5:

| r | d[l] | $n_d$ | $v_d$ |
|---|---|---|---|
| 129.83 | | | |
| | 5.0 | 1.788 | 47.39 |
| ∞ | | | |
| | 0.05 | | |
| 49.00 | | | |
| | 12.5 | 1.719 | 50.41 |
| −73.10 | | | |
| | 2.0 | 1.721 | 29.25 |
| 65.84 | | | |
| | $l_I$ | | |
| 150.0 | | | |
| | 1.85 | 1.620 | 60.33 |
| 31.05 | | | |
| | 2.85 | | |
| 114.0 | | | |
| | 1.5 | 1.620 | 60.33 |
| 26.10 | | | |
| | 5.5 | | |
| −53.0 | | | |
| | 6.5 | 1.784 | 26.08 |
| −18.5 | | | |
| | 1.0 | 1.788 | 47.39 |
| −3076.27 | | | |
| | $l_{II}$ | | |
| −155.0 | | | |
| | 1.5 | 1.625 | 35.70 |
| 52.0 | | | |
| | 1.25 | | |
| 91.0 | | | |
| | 9.0 | 1.696 | 56.18 |
| −37.39 | | | |
| | $l_{III}$ | | |
| 28.9 | | | |
| | 7.5 | 1.589 | 61.27 |
| −62.5 | | | |
| | 2.0 | 1.620 | 36.37 |
| 75.0 | | | |
| | $l_{IV}$ | | |
| ∞ | | | |
| | 1.35 | 1.691 | 54.71 |
| 28.75 | | | |
| | 2.5 | | |
| −142.0 | | | |
| | 0.85 | 1.620 | 60.33 |
| 9.4 | | | |
| | 3.5 | 1.620 | 36.37 |
| 28.63 | | | |
| | $l_V$ | | |
| 935.0 | | | |
| | 2.0 | 1.647 | 33.85 |
| 28.75 | | | |
| | 6.0 | 1.623 | 58.06 |
| −44.60 | | | |
| | 1.0 | | |

-continued

| r | d[1] | $n_d$ | $v_d$ |
|---|---|---|---|
| ∞ | | | |
| | 5.0 | 1.568 | 56.13 |
| ∞ | | | |
| | 3.3 | | |
| 39.15 | | | |
| | 7.0 | 1.744 | 44.77 |
| 248.55 | | | |
| | 12.35 | | |
| −50.0 | | | |
| | 13.75 | 1.805 | 25.43 |
| 50.0 | | | |
| | 1.55 | | |
| 667.0 | | | |
| | 7.45 | 1.670 | 47.11 |
| −38.7 | | | |
| | 0.25 | | |
| 40.0 | | | |
| | 7.25 | 1.620 | 60.33 |
| −194.55 | | | |
| | 32.10 | | |

8. An optical system for extremely high focal length variation, comprising an attachment of variable magnification and a base objective of fixed focal length, whereby the attachment has at least four lens members which are displaceable along the optical axis with the focal length change, comprising (viewed in the incoming direction of the light)
  first and fourth displaceable lens members,
  second and third lens members,
  means for displacing said first and fourth displaceable lens members according to the same movement law,
  means for displacing said second and third lens members according to movememt laws which are different from each other,
the optical system having the following data, within a deviation of the curvature of individual surfaces and of the thicknesses of up to ±10% of the optical power of the corresponding member, of the refractive indexes up to ±0.03 and of the Abbe numbers up to ±5:

| r | d[1] | $n_d$ | $v_d$ |
|---|---|---|---|
| 124.0 | | | |
| ∞ | 6.5 | 1.744 | 44.77 |
| ∞ | | | |
| | 0.1 | | |
| 65.54 | | | |
| | 14.0 | 1.719 | 50.41 |
| −54.0 | | | |

-continued

| r | d[1] | $n_d$ | $v_d$ |
|---|---|---|---|
| | 2.0 | 1.721 | 29.25 |
| 116.65 | | | |
| | $l_I$ | | |
| 150.0 | | | |
| | 1.85 | 1.623 | 58.06 |
| 31.05 | | | |
| | 3.5 | | |
| 114.0 | | | |
| | 1.5 | 1.623 | 58.06 |
| 26.10 | | | |
| | 6.5 | | |
| −53.0 | | | |
| | 6.5 | 1.784 | 26.08 |
| −18.5 | | | |
| | 1.0 | 1.788 | 47.39 |
| −838.1 | | | |
| | $l_{II}$ | | |
| −428.14 | | | |
| | 1.5 | 1.784 | 26.08 |
| 57.0 | | | |
| | 1.25 | | |
| 91.0 | | | |
| | 7.0 | 1.691 | 54.71 |
| −37.36 | | | |
| | $l_{III}$ | | |
| 28.9 | | | |
| | 5.0 | 1.589 | 61.27 |
| 71.46 | | | |
| | $l_{IV}$ | | |
| ∞ | | | |
| | 1.35 | 1.691 | 54.71 |
| 28.75 | | | |
| | 2.5 | | |
| −142.0 | | | |
| | 0.85 | 1.620 | 60.33 |
| 9.4 | | | |
| | 3.5 | 1.620 | 36.37 |
| 28.63 | | | |
| | $l_V$ | | |
| 935.0 | | | |
| | 1.0 | 1.623 | 58.06 |
| ∞ | | | |
| | 4.0 | 1.623 | 58.06 |
| −47.34 | | | |
| | 1.0 | | |
| ∞ | | | |
| | 5.0 | 1.568 | 56.13 |
| ∞ | | | |
| | 3.3 | | |
| 31.55 | | | |
| | 7.7 | 1.623 | 58.06 |
| −67.50 | | | |
| | 1.4 | | |
| −43.47 | | | |
| | 10.5 | 1.762 | 26.53 |
| 19.68 | | | |
| | 2.65 | | |
| 27.10 | | | |
| | 6.5 | 1.788 | 47.39 |
| −44.44 | | | |
| | 30.46 | | |

* * * * *